(12) United States Patent
Handerek

(10) Patent No.: US 8,760,639 B2
(45) Date of Patent: Jun. 24, 2014

(54) DISTRIBUTED OPTICAL FIBRE SENSING

(71) Applicant: Fotech Solutions Limited, London (GB)

(72) Inventor: Vincent Andrei Handerek, Essex (GB)

(73) Assignee: Fotech Solutions Limited, London (GB)

( * ) Notice: Subject to any disclaimer, the term of this patent is extended or adjusted under 35 U.S.C. 154(b) by 0 days.

(21) Appl. No.: 13/939,757

(22) Filed: Jul. 11, 2013

(65) Prior Publication Data

US 2013/0301037 A1 Nov. 14, 2013

Related U.S. Application Data

(62) Division of application No. 13/386,189, filed as application No. PCT/GB2010/001404 on Jul. 23, 2010, now Pat. No. 8,520,197.

(30) Foreign Application Priority Data

Jul. 23, 2009 (GB) .................................. 0912851.3

(51) Int. Cl.
*G01N 21/00* (2006.01)

(52) U.S. Cl.
USPC ....................................................... 356/73.1

(58) Field of Classification Search
USPC ....................................................... 356/73.1
See application file for complete search history.

(56) References Cited

U.S. PATENT DOCUMENTS

| | | | |
|---|---|---|---|
| 5,513,913 A | 5/1996 | Ball et al. | |
| 5,627,934 A | 5/1997 | Muhs | |
| 5,696,863 A | 12/1997 | Kleinerman | |
| 6,937,151 B1 | 8/2005 | Tapanes | |
| 7,130,496 B2 * | 10/2006 | Rogers ........................... | 385/11 |
| 7,382,465 B1 | 6/2008 | Pepper | |
| 8,094,977 B2 * | 1/2012 | Murphy et al. ................. | 385/13 |
| 8,121,442 B2 * | 2/2012 | Huffman et al. ................ | 385/13 |
| 2003/0094281 A1 | 5/2003 | Tubel | |
| 2005/0271317 A1 | 12/2005 | Taverner | |
| 2006/0013544 A1 | 1/2006 | Bouma et al. | |
| 2006/0153491 A1 | 7/2006 | Murphy et al. | |
| 2008/0084914 A1 | 4/2008 | Yamamoto et al. | |

FOREIGN PATENT DOCUMENTS

| | | |
|---|---|---|
| EP | 1939596 A1 | 7/2008 |
| JP | 02019997 A | 1/1990 |
| WO | 2007104915 A1 | 9/2007 |
| WO | 2008056143 A1 | 5/2008 |
| WO | 2008073033 A1 | 6/2008 |
| WO | 2008115375 A1 | 9/2008 |

OTHER PUBLICATIONS

PCT Written Opinion of the International Searching Authority for International Application No. PCT/GB2010/001404, 11 pgs.
GB Search Report for Appln. No. GB0912851.3 dated Nov. 26, 2009, 3 pgs.
GB Search Report for Appln. No. GB0912851.3 dated Feb. 19, 2010, 1 pgs.
Parker et al., "A Fully Distributed Simultaneous Strain and Temperature Sensor using Spontaneous Brillouin Backscatter," IEEE Photonics Technology Letters, 9(7):979-981, Jul. 1997.

* cited by examiner

*Primary Examiner* — Tu Nguyen
(74) *Attorney, Agent, or Firm* — K&L Gates LLP

(57) ABSTRACT

There is disclosed a distributed optical fiber sensing system in which the sensor fiber comprises at least first and second waveguides used for separate sensing operations. The sensor fiber may be, for example, a double clad fiber having a monomode core and a multimode inner cladding.

25 Claims, 6 Drawing Sheets

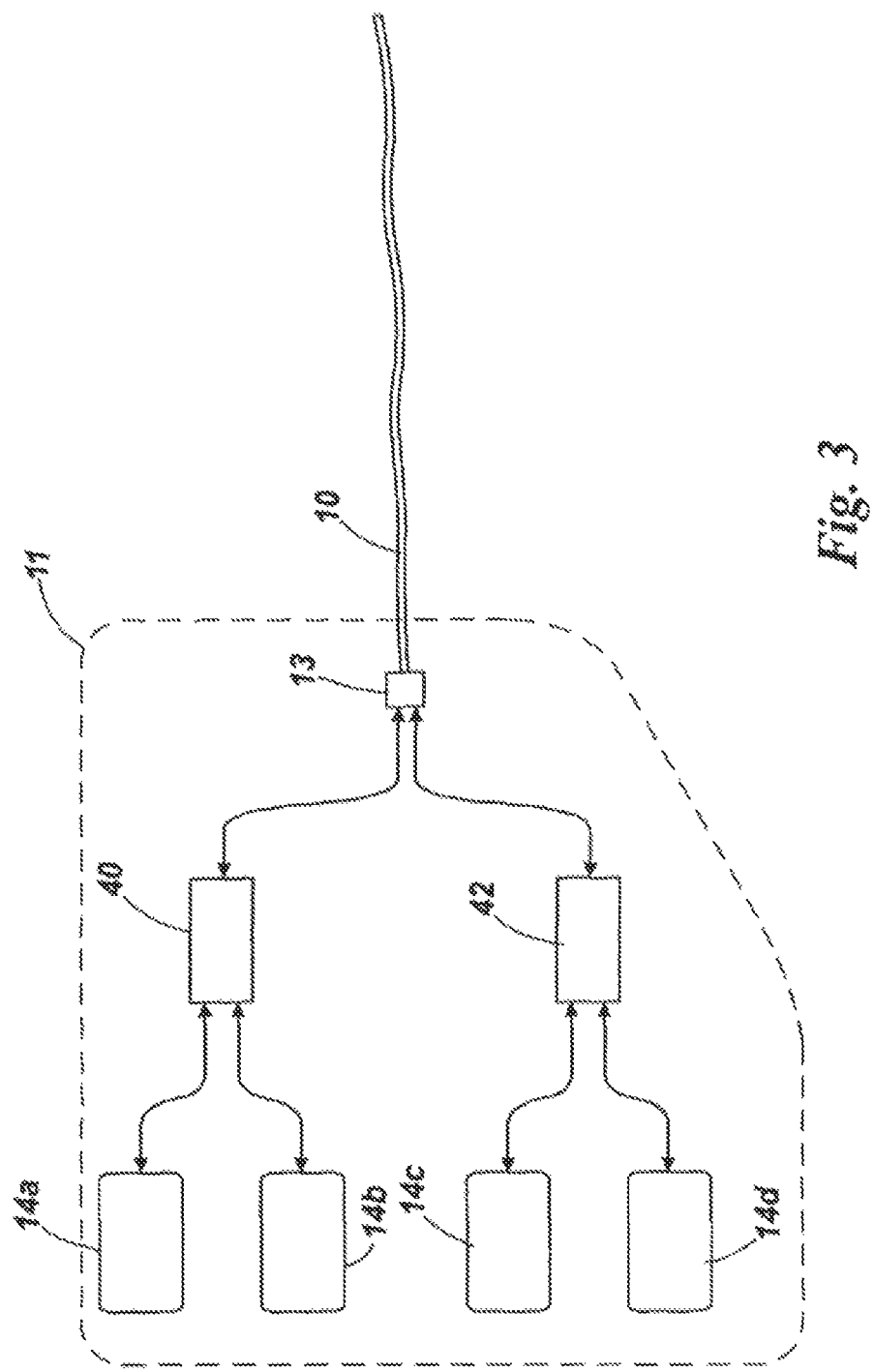

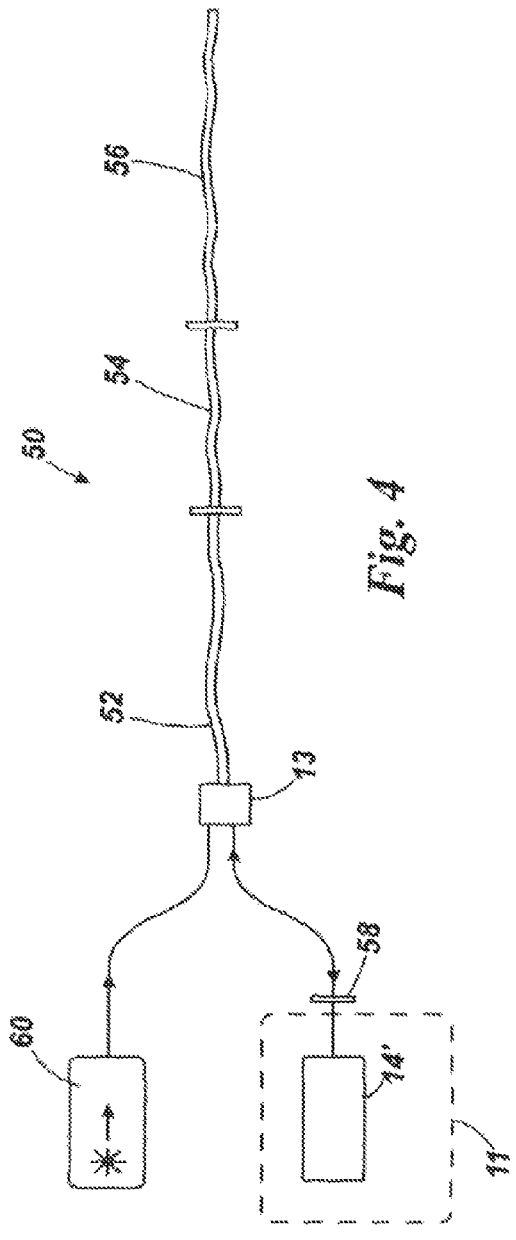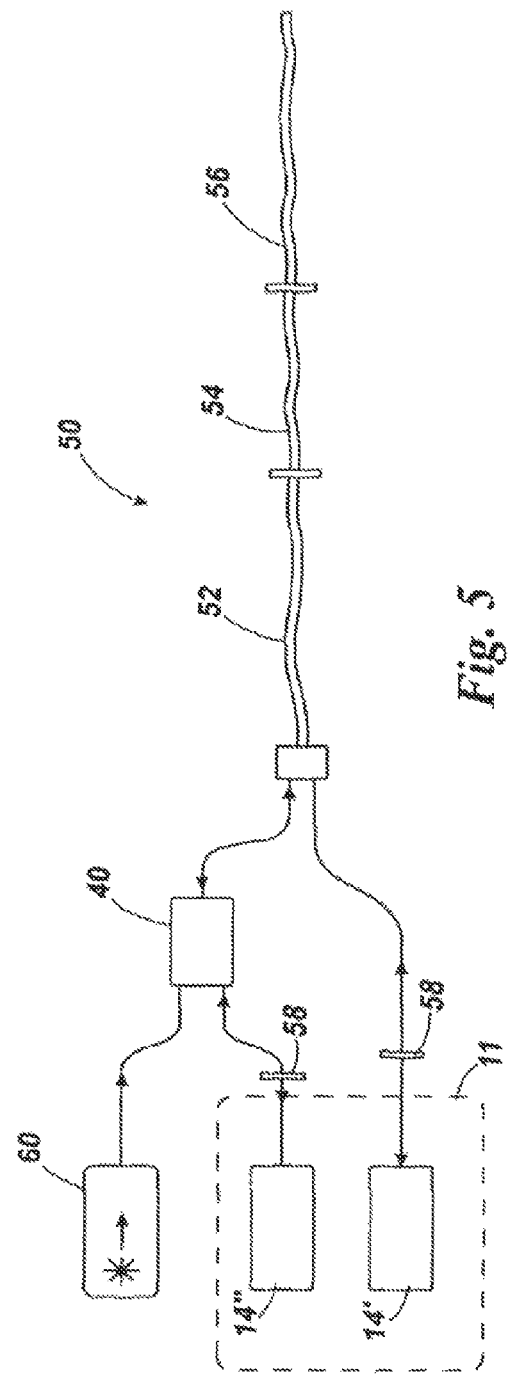

DISTRIBUTED OPTICAL FIBRE SENSING

CROSS REFERENCE TO RELATED APPLICATIONS

This application is a divisional application of U.S. non-provisional application Ser. No. 13/386,189 filed on Jan. 20, 2012, now issued as U.S. Pat. No. 8,520,197 on Aug. 27, 2013 and claims priority to International Application PCT/GB2010/001404, filed on Jul. 23, 2010, which claims priority to and the benefit of U.K. Patent Application 0912851.3, filed on Jul. 23, 2009, the entire disclosures of each of which are incorporated by reference herein.

The present invention relates to apparatus and methods for distributed optical sensing, in which parameters such as temperature, strain and vibration are measured along extended lengths of a sensor optical fiber, as a function of position along the sensor fiber, by detecting properties of light scattered within the fiber.

INTRODUCTION

Distributed optical fiber sensing is a well known approach to providing information about environmental conditions along the length of a sensor optical fiber which can extend for considerable distances along structures such as pipelines, cables, building and bridges, down boreholes, and in numerous other applications. In principle, spatially resolved information about environmental conditions can be obtained from every point along the sensor fiber, subject to issues such as spatial resolution, and reduced signal strength as the range is extended. Environmental parameters that can be sensed through their corresponding influence on the optical fiber include temperature, static strain and vibration, and various optical techniques have been used separately and in combinations to make improved measurements of one or more such variables. Other parameters such as pressure can also be sensed, for example by suitable packaging of the optical fiber to convert a pressure effect into a local strain effect.

Distributed optical fiber sensing involved launching probe light into the sensor fiber, and detecting properties of probe light received at an interrogator, usually via a back-scattering process. The different techniques which may be used to analyses the scattered light include analysis of Rayliegh scattering which involves no frequency shift of the probe light, analysis of the Raman scattered spectrum, and analysis of the Brillouin scattered spectrum.

Rayleigh scattering is a relatively strong effect caused by the inhomogeneity of the fiber. It may be accompanied by scattering off discontinuities such as point imperfections and joints in the fiber, or from more gradual sources of attenuation such as bends and changes in refractive index. To establish the location of discontinuities to within distances of the order of a meter, very short pulses of probe light, for example just a few nanoseconds may be used. More gradual changes in refractive index may be caused by physical strain and temperature changes, and can be detected by variations in the phase of the Rayleigh scattered light using much more coherent, longer pulses of probe light. The phase variations may be detected as a temporal "speckle pattern" at the interrogator as slight timing differences in travel velocity along the length of the fiber due to refractive index variations cause returning scattered light to self-interfere. Such coherent Rayleigh back-scatter techniques are discussed, for example, in WO2008/056143. Rayleigh scattering techniques, generally referred to as optical time domain reflectometry (OTDR) can be used to detect changes which are fairly rapid over time, for example at acoustic frequencies, because the high scattering cross sections lead to relatively short detector integration times, as well as very location specific defects such as fiber damage.

Brillouin scattering occurs when probe light scatters off phonons in the optical fiber. Probe light is scattered to both higher and lower wavelengths, typically by about 10 GHz, due to the Doppler shift effect of phonons moving towards and away from the interrogator. The magnitude of the frequency shift and the relative intensities of the usual two peaks depend upon a combination of fiber temperature and strain, and careful examination of the Brillouin spectrum alone can be used to detect the separate parameters, as described in Parker et al. IEEE Photonics Technology Letters, vol 9(7) July 1997, p 979-981. The total Brillouin scattering cross sections are generally about one to two orders of magnitude weaker than Rayliegh scattering.

Raman scattering occurs when probe light interacts with molecular bonds in the optical fiber. As for Brillouin scattering, probe light is scattered to both higher and lower wavelengths. However a broader spectrum having a detailed structure characteristic of the chemistry of the scattering medium is generated, with particular spectral features around 13 THz from the probe frequency being used. Although the total Raman scattering cross section might typically be only two orders of magnitude weaker than the total Brillouin cross section, the intensity of individual Raman spectral features will be far weaker still. The Raman spectrum is dependent on temperature, but not on strain, so may be used in combination with a Brillouin technique to derive a less ambiguous measure of strain or vibration in the optical fiber.

It is also known to use two or more separate sensing techniques at the same time in order to take advantage of the different characteristics of each. WO2007/104915 describes the simultaneous use of Brillouin backscatter with coherent or broadband Rayleigh noise to detect rapidly and more slowly varying characteristics of a structure such as a pipeline.

Interrogation techniques which rely on Rayleigh and Brillouin scattering are best performed using a single mode optical fiber, to reduce model dispersion. Interrogation techniques which rely on Raman scattering generally require much higher probe light intensities which can cause damage, especially at connectors and joints, or undesirable effects such as stimulated Brillouin scattering in the narrow core of a single mode fiber, so are best performed using multimode optical fiber. Suitable multimode fibers need not be any larger in overall diameter than a single mode fiber, but the guiding region is normally much larger than that inside a single mode fiber, and the refractive index difference between the core and the cladding is also usually much larger. Multimode fiber designs vary widely. Optical guidance can be accomplished by using a uniform glass core surrounded by a polymer with low refractive index, by doping an outer glass region to lower its refractive index, or by doping a central region of the fiber to increase its refractive index. Depending on the dopant type and concentration, uniform or graded refractive index distributions can be created, and all of these designs are in principle compatible with distributed fiber sensing use Raman scattering.

It would be desirable to address these and other problems of the related prior art.

SUMMARY OF THE INVENTION

The invention provides a distributed optical fiber sensor system in which multiple waveguides of a single optical fiber are used to implement more than one sensing operation or sensing technique using backscatter of probe light within the same sensor fiber. In particular a double clad fiber, which typically combines a single mode waveguide with a multimode waveguide typically provided by an inner cladding, may be used so that sensing techniques which benefit from use of a multimode fiber, such as those using Raman scattering, can be implemented in parallel with techniques which benefit from use of a single mode fiber, such as those using Rayleigh or Brillouin scattering, without needing to use multiple parallel sensor fibers. The invention therefore provides a distributed fiber sensor apparatus in which the sensor fiber is, or comprises at least a length of a double clad fiber. Of course, the system can be arranged to use various combinations of multiple sensing operations and techniques with the multiple parallel waveguides of the sensing fiber, and systems may be envisaged in which sections of various different fiber types are used and interlinked.

The use of a double clad fiber as the sensor fiber also enables pump light to be delivered along the multimode waveguide to a distant optical amplifier section of the sensor fiber, where signal amplification is desired, for example to amplify the probe light used to carry out a sensing operation. This can be used to improve the range and/or sensitivity of a sensing operation, especially a sensing operation using the single mode waveguide, whether or not a parallel sensing operation is also using the multimode waveguide. The invention therefore also provides a distributed fiber sensor apparatus in which the sensor fiber comprises a double clad fiber and an optical amplifier section, which may also be of double clad fiber. An additional pump light source is also required, for connection to the multimode waveguide of the sensor fiber so as to drive the optical amplifier.

This aspect of the invention may be helpful to compensate for a double clad fiber having higher attenuation than an alternative single core fiber, or for significant attenuation in connectors.

If high probe light powers are required for a sensing operation using a single mode waveguide, then such high powers can cause damage at connectors, especially connectors closer to the probe light source. If probe light in the single mode waveguide is amplified to required power levels after particular connector interfaces have been traversed, then the conditions for optically induced damage at the connectors can be avoided, because equivalently high pump powers are spread out over the relatively large area of the multimode waveguide, reducing the optical intensity at the connectors below any optical damage threshold.

In the prior art, double clad fiber is frequently used to facilitate the construction of active optical devices such as optical fiber lasers and optical amplifiers, in which the single mode waveguide carries "signal" light having a first wavelength, and in which the single mode waveguide is doped with an active optical dopant which absorbs "pump" light carried in the multimode waveguide. The optical amplifier section of the present invention may comprise a section of such doped double clad fiber, while other sections of the sensor fiber may be provided by undoped, or passive sections of double clad fiber. The sensor fiber, or sections such as passive sections of the sensor fiber as appropriate, may be selected or designed to provide the lowest practical attenuation in order to extend the useful range of the sensor. The sensor fiber, or sections of the fiber may also be designed to provide other desirable characteristics, such as particular dispersion or scattering properties, in order to further optimize the range or sensing performance or both.

Double clad fiber used for the sensor fiber may include joints and connectors as necessary or practical. Sections of other fiber types may also be used in the sensor fiber, for example a final length of single mode fiber distant from an interrogator function, or linking sections of separate single and multi mode fibers.

Another aspect of the invention is to use a pump-signal combiner component to make the single mode and multimode waveguides of the double clad sensor fiber available for sensing operation simultaneously, by linking optical fibers from interrogation functions or units into the separate waveguides of the sensor fiber with low connection losses and without blocking either path.

Although double clad fibers and pump signal combiners are usually designed to minimize cross-talk between the multimode and single mode waveguides, they may not be perfect in this regard, and such cross-talk could be detrimental to the independent operation of interrogators simultaneously connected to the sensor fiber for sensing operations. Such cross-talk may therefore be minimized by using probe light of different wavelengths between different interrogators and/or waveguides, and using optical filters to increase isolation between interrogators sharing the double clad fiber.

Separation between launched and backscattered probe light is typically accomplished in distributed fiber sensors, as well as other instruments, by using passive components such as splitters and circulators. In a distributed sensing system using double clad fiber, these components should be selected to be compatible with the fiber types used, and may be separately integrated into the interrogator optics for the single mode and multiple mode sensing operations, on the instrumentation side of the pump-signal combiner.

Typically, the sensor fiber may extend at least a hundred meters from the interrogation system and frequently tens of kilometers. When the above mentioned optical amplifier is implemented in the sensor fiber, it may typically be used at least a hundred meters from the interrogation system, although it may also be useful to implement the optical amplifier much closer to the interrogation system for example less than a meter along the sensor fiber, if the intended purpose of the amplifier is to avoid high probe light powers damaging connectors proximate to or forming part of the interrogation system.

Accordingly, the invention provides a distributed optical fiber sensing system, for example for monitoring an environment, comprising: a sensor fiber, extending through the environment, having first and second waveguides; and an interrogation system coupled to the sensor fiber and arranged to use probe light in the first waveguide to carry out at least a first sensing operation to obtain scattering information from multiple locations, or distributed along the sensor fiber and to use other probe light in the second waveguide to carry out at least a second sensing operation to obtain other, different scattering information from multiple locations, or distributed along the sensor fiber. The scattering information is then used to derive one or more physical parameters relating to the sensing fiber and/or its environment (such as temperature, strain, vibration, bending, pressure, etc). In particular, scattering information from two or more sensing operations, and in particular form the two waveguides, may be combined to carry out such a derivation.

The first and second waveguides may be adjacent, c-axial, or otherwise co-extending along the sensor fiber.

The sensor fiber may be constructed such that the first waveguide is a single mode waveguide and the second waveguide is a multimode waveguide. In particular, the first and second adjacent waveguides may be waveguides of a double clad optical fiber, in which the single mode waveguide is a single mode core of the double clad fiber. The first sensing operation may utilize at least Brillouin backscatter or Rayleigh scattering within the single mode waveguide to obtain scattering information from along the sensor fiber, and the second sensing operation may utilize Raman scattering within the multimode waveguide to obtain different scattering information from along the sensor fiber.

More generally, however, the sensing operations may each use one or more of a variety of techniques including Rayleigh scattering, optical time domain reflectometry, coherent or partially coherent optical time domain reflectometry, spontaneous or stimulated Brillouin scattering, and spontaneous or stimulated Raman scattering, noting that these terms are not all intended to be mutually exclusive.

The interrogation system may be arranged to carry out the first and second sensing operations utilizing light of different wavelengths to thereby avoid interference between the first and second sensing operations arising from leakage between the first and second waveguide. The interrogation system may also be arranged to carry out multiple sensing operations using one of said first and second waveguides utilizing probe light of different wavelength for each said sensing operation in the one waveguide.

The system may further comprise a pump light source coupled to the second waveguide. The sensor fiber may then include a section remote from the interrogation system configured as an optical amplifier such that probe light in the first waveguide is amplified by the optical amplifier.

The system may comprise a pump-signal combiner arranged to optically couple the interrogation system to the first and second waveguide. A double-clad fiber section of the sensor fiber may then be terminated at the pump-signal combiner, so that the pump-signal combiner couples the first and second waveguides of the double clad fiber separately to at least first and second interrogation units of the interrogator system. For example, the first interrogation unit may be coupled by the pump-signal combiner to the first, single mode waveguide of the double clad fiber so as to determine Rayleigh and/or Brillouin backscatter properties of the sensor fiber, and the second interrogation unit may be coupled by the pump-signal combiner to the second, multi mode waveguide of the double clad fiber so as to determine Raman backscatter properties of the sensor fiber.

The invention also provides a distributed optical fiber sensing system comprising: a sensor fiber; a pump light source arranged to deliver pump light into the sensor fiber; and an interrogator system coupled to the sensor fiber to obtain scattering information from along the sensor fiber, the sensor fiber comprising a first section proximal to the interrogator, a second section distal from the interrogator, and an optical amplifier section between the first and second sections, at least the first section of the sensor fiber comprising double clad optical fiber having a single mode waveguide and a multimode waveguide, the interrogator system being coupled to the single mode waveguide to detect scattering information from along the sensor fiber using probe light injected into the single mode waveguide, and the pump light source being coupled to the multimode waveguide, the system being arranged such that the optical amplifier section amplifies said probe light using said pump light.

In particular, the optical amplifier may comprise an optically active length of double clad fiber.

The interrogator system may also be coupled to the multimode waveguide of the first section of the sensor fiber, to also detect scattering information from along the sensor fiber using probe light injected into the multimode waveguide. The interrogator systems may then use a first sensing technique to detect scattering properties of one or more of the single mode waveguide sections of the sensing fiber, and a second sensing technique to detect scattering properties of one or more of the multimode waveguide sections of the sensor fiber.

At least a part of the second section of the sensor fiber may comprise a single clad fiber coupled to the single mode core of the first section of the sensor fiber through the single mode core of the optical amplifier section, such that the interrogator system can determine scattering properties along the single clad fiber using said probe light injected into said single mode waveguide.

The interrogator system may comprise one or more interrogator units each arranged to carry out a separate sensing operation to determine scattering properties along the sensing fiber. The system may be further adapted to derive one or more physical properties along the sensing fiber from said scattering properties.

In accordance with the above discussion, the invention generally provides a distributed fiber sensing system arranged to detect scattering properties along a sensor fiber, the sensor fiber comprising at least a length of double clad optional fiber.

The invention also provides methods corresponding to the above systems and apparatus. For example, the invention provides a method of carrying out distributed fiber optic sensing by using two waveguides of a single fiber, such as the single mode and multimode waveguides of a double clad fiber, to carry out two or more different sensing operations. More specifically, the invention may provide a method of determining physical parameters along an extended path through an environment, comprising: running a sensor optical fiber along the path through the environment, the sensor fiber having first and second waveguides as discussed above; performing separate sensing operations using the first and second waveguides, to determine scattering properties of probe light at multiple locations along the extended path; and determining said physical parameters from said scattering properties.

The invention also provides methods, and corresponding apparatus, for distributed vibration sensing using Rayleigh backscatter within a multiple mode optical fiber, comprising coupling an interrogator to the multiple mode optical fiber using a double clad optical fiber having a single mode waveguide and a multiple mode waveguide, receiving at the interrogator, through the single mode waveguide of the double clad optical fiber, light backscattered within the multiple mode optical fiber, and detecting vibrations as a function of position along the multiple mode optical fiber from the received backscattered light. This technique may be used, for example, to implement coherent or partly coherent Rayleigh backscatter detection of vibrations in a well bore in which a multiple mode fiber has already been installed, and allows continued use of the installed multiple mode fiber for other purposes such as distributed temperature sensing within the well bore.

BRIEF DESCRIPTION OF THE FIGURES

FIG. 3 illustrates variations on the distributed optical fiber sensor of FIG. 1, using four interrogator units instead of two;

FIG. 4 illustrates a further variation of a distributed optical fiber sensor according to the invention, in which a pump source 60 is used to drive an optical amplifier section 54 in the sensor fiber 50;

FIG. 5 illustrates a variation to FIG. 4, in which two interrogators 14 are coupled to separate waveguides of the sensor fiber 50;

DETAILED DESCRIPTION OF EMBODIMENTS

Figure 1:
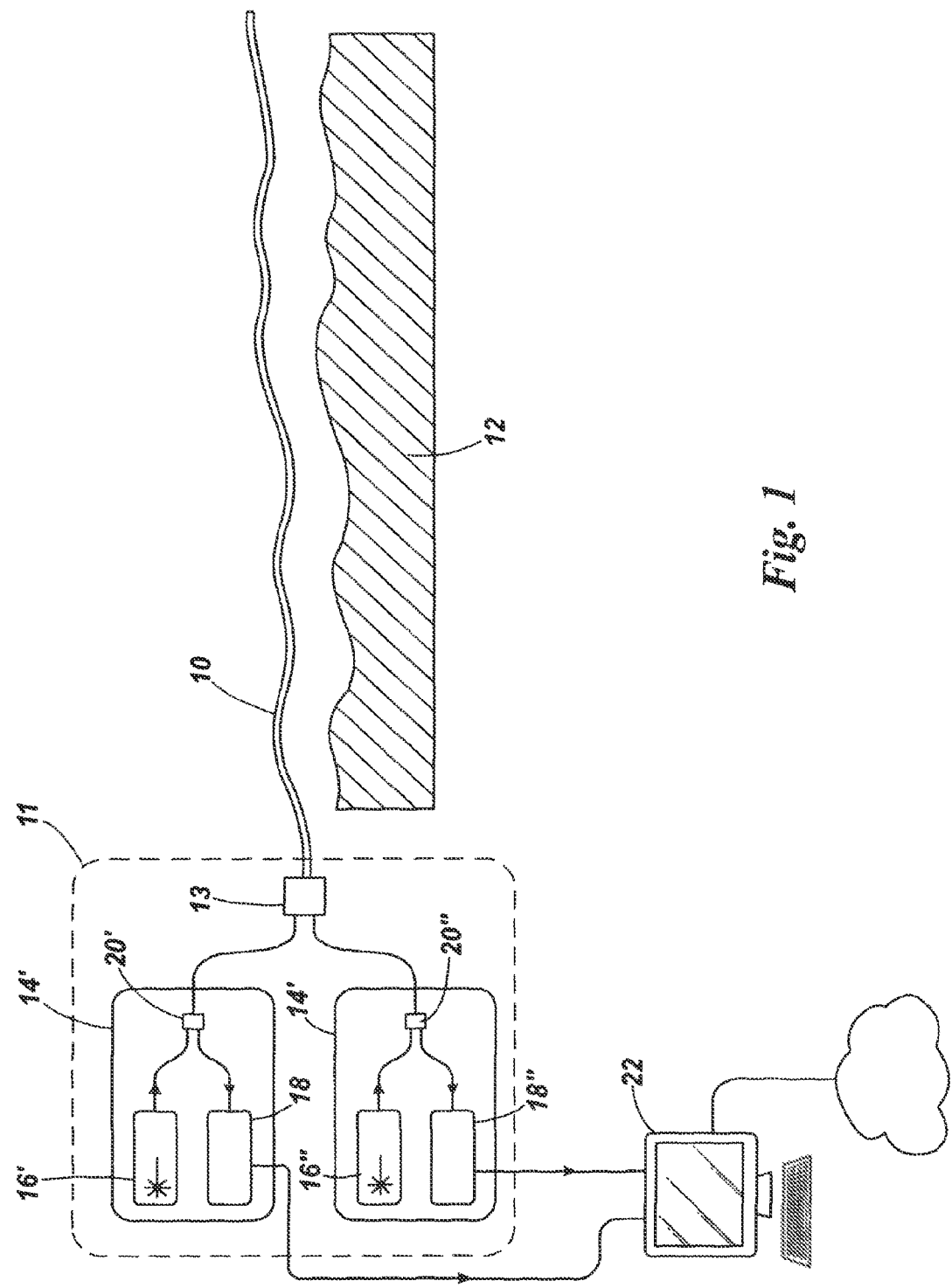
FIG. 1 illustrates a distributed optical fiber sensor according to the invention, including two interrogators coupled to separate waveguides of a sensor fiber 10.

Referring to FIG. 1 there is shown an example distributed optical sensing system according to the invention. A sensor fiber 10, which may be housed for example as part of a cable structure, extends through an environment to be monitored, for example along a structure 12 such as a pipeline. The sensor fiber is a double clad optical fiber, although other fiber types having two or more waveguides extending together along the fiber may be used. The sensor fiber 10 is coupled to an interrogator system 11. In FIG. 1 the interrogator system comprises two interrogator units 14' and 14", which are both coupled to the sensor fiber using a combiner 13. Each interrogator unit 14 includes a probe light source 16, an optical analyser 18, and a couple 20 to link both the respective probe light source 16 and the respective optical analyser 18 to a fiber running to the combiner 13. Typically, each probe light source 16 might include a laser such as a semiconductor laser, driving electronics for controlling the laser, temperature control for the laser, optical filters to condition the probe light before delivery to the combiner, and so forth. Typically, each optical analyser 18 might include optical amplifier and filter elements, along with spectrometer and/or photodetector capability, which can be operated to carry out the spectral and/or temporal analysis of the backscattered probe light to derive the scattering information necessary to determine the relevant environmental and/or physical parameters such as temperature, strain and vibration at various points aloud the sensor fiber. Each coupler 20 could be provided by a 50/50 optical fiber coupler or optical circulator or similar.

Figure 2:
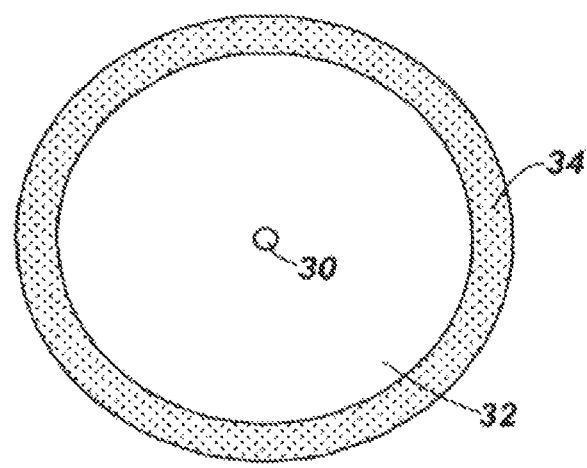
FIG. 2 is a cross section through a double clad optical fiber which may be used as the sensor fiber 10 of FIG. 1.

The double clad optical fiber provides at least two waveguides. The combiner 13 operates to couple one of the interrogator units 14' to a first of the waveguides, and the second interrogator unit to a second of the waveguides. As illustrated in section in FIG. 2, a typical double clad fiber comprises a relatively narrow single mode core waveguide 30, surrounded by a larger inner cladding 32 which forms a multi-mode waveguide. The inner cladding is surrounded by an outer cladding 34. For convenience of fabrication and joining to other fibers, the single mode core may be concentric within the inner and outer cladding layers, but this need not be the case, and non-concentric and non-circular waveguides may be used. Similarly, a circular single mode core may be advantageous and convenient, but other core section shapes may be used.

Generally, double clad optical fibers are constructed using steps in refractive index between the different parts to form the waveguides, but graduated refractive index changes may also be used. Construction techniques may include using different materials for the different parts of the fiber including glass and polymer materials, and the doping of materials to vary the refractive index of parts of the fiber.

The coupler 13 may be implemented using a known "pump-signal combiner" component, which is a passive optical component used in the prior art to couple a pump beam and a signal beam into a double clad fiber laser amplifier. The pump signal combiner provides access to both waveguides of the double clad fiber simultaneously, with low optical losses.

Data acquired by each optical analyser 18 is processed, and if necessary displayed and/or stored by a data processor 22, which could be a general purpose personal computer, or a more specifically constructed data processing system. For example, the data processor may receive spectral or temporal scattering information in a raw, processed, parameterised or other form, from the optical analysers and process this information to derive relevant physical and other parameters such as temperature and strain values and/or profiles along sections of the sensor fiber for display, storage, or delivery over the network. Scattering data from two or more sensing operations may be combined to service particular parameters. For example, scattering data from a Brillouin sensing operation and a Raman sensing operation may be combined to derive an improved measure of strain along the sensing fiber. Scattering data and physical parameters may be gathered, processed and derived in respect of particular points, particular sections or the entire length of the sensor fiber, as desired or required by a particular application.

The optical analysers 18', 18" and data processor 22 may be combined into a single unit for convenience of use and installation, and may be connected to a wider data network 24 such as the Internet for remote access to the data. Separate data processing capability may be provided for each optical analyser.

In use, each light source 16 delivers carefully controlled probe light into the sensor fiber 10, through each coupler 20', 20" and the combiner 13. The probe light interacts in various ways with the sensor fiber 10, and some of the scattered light returns back to each interrogator where it is analysed. Various properties of the scattered light can be measured to determine properties of the optical fiber 10 and therefore of its environment for example the structure 12. The data processor 22 may be used to derive, and if required display, store or deliver over the network particular physical parameters or profiles of parameters, such as temperature, static and dynamic strain along some or all of the double clad fiber 12.

Preferably, a first of the optical analysers 14' is adapted to carry out Rayleigh scattering and/or Brillouin scattering analysis of the scattered light, and is coupled to the single mode core waveguide of the double clad optical fiber. The second analyser 14" is adapted to carry out Raman scattering analysis of the scattered light, and is coupled to the multi-mode inner cladding waveguide of the double clad optical fiber. In this way two or more different analysis techniques may be optimised without need to use two or more separate sensor fibers 10.

Although the double clad fiber may be designed to minimize cross-talk between the waveguides and the combiner, this will rarely be perfect and some probe light from each interrogator unit will therefore be represented in the scattered light received by the other. The light sources 18', 18" may therefore be arranged to deliver probe light of different wavelengths to the different waveguides, to help suppress interference between the interrogator units, and improve the results of the scattering analysis carried out by each interrogator unit. To this end, optical filters tuned to the different waveguides may be used, for example as part of each interrogator unit, to increase the optical isolation between the two interrogator units.

It will be apparent to the skilled person that more than two interrogator units may be used, analysing the scattered probe light using one, two, or more than two different types of analysis, for example selected from Rayleigh scatter methods such as OTDR and coherent OTDR, as well as Brillouin backscatter and Raman scattering techniques. A variation of the distributed fiber sensing system of FIG. 1 is shown in FIG. 3. In this system, for optical backscatter interrogator units *14a . . . , 14d) are shown connected to the sensing fiber 10, with two "single mode" interrogator units 14a, 14b being connected to the single mode waveguide and two "multi mode" interrogator units 14c, 14d connected to the multlimode waveguide. The two single mode interrogator units 14a, 14b are coupled using a wavelength multiplexer/demultiplexer 40 enabling each of the two single mode interrogator units to operate using the single mode waveguide using a different wavelength or waveband of probe light. The two multi-mode interrogator units 14c, 14d are similarly coupled using a wavelength multiplexer/demultiplexer 42.

In FIG. 3 details of the interrogator units and their connectivity to data processor functions are not shown, but may be similar to those shown in FIG. 1. The interrogator units of FIG. 3 may be used to apply four analysis techniques simultaneously. For example, interrogator unit 14a may operate using coherent Rayleigh noise to detect vibration, and interrogator unit 14b may operate using Brillouin scattering to measure static strain, both using the multimode waveguide of the sensor fiber 10. At the same time, interrogator unit 14c may operate using Raman scattering to measure temperature, and interrogator unit 14d may operate to measure fiber attenuation, for calibration or other purposes, both using the single mode waveguide of the sensor fiber 10.

Although the different analysis techniques may be carried out using separate interrogator units, it is possible to combine parts of all of the different interrogator units so that separate interrogator functions are implemented using common elements. For example, two or more separate interrogator functions may share a common laser, spectometer or other components, or may be implemented entirely using common optical components.

Another embodiment of the invention is illustrated in FIG. 4. In this embodiment the sensing fiber 50 includes at least three sections. A first section 52 is made of a double clad fiber having a single mode waveguides and a multi mode waveguide. A second section 56 may be made of double clad or more conventional single clad fiber. Between the first and second sections is an optical amplifier section 54, formed of a length of double clad fiber suitable doped to make it optically active. The first and second sections and the amplifier section may be joined using conventional fiber connectors and/or splice joints as appropriate, and may include other sections, joints and connectors as required.

The first section 52 of the sensor fiber is also connected to a pump source 60 and an interrogator unit 14'. The interrogator unit 14' may be similar to those already described, and is coupled to the single mode core of the first section of the sensor fiber through coupler 13. The interrogator delivers probe light into the sensor fiber, and collects probe light scattered back from the sensor fiber, using one or more analysis techniques to detect properties distributed along one or more sections of the sensor fiber.

The pump source delivers pump light into the multi mode waveguide of the first section of the sensor fiber. The pump light is delivered through the first section of sensor fiber to the amplifier section where it is used to amplify the probe light, thereby increasing the strength of the signal detected by the interrogator unit.

A filter may 58 may be used to reduce or prevent pump light from reaching the interrogator unit 14' and affecting its performance. The pump light may be delivered to the combiner through an additional wavelength multiplexer (not shown), for example to implement a more sophisticated amplifier pump scheme.

One or more sections of the multi mode waveguide of the sensor fiber may also be used to implement a sensing operation, for example as illustrated in FIG. 5, in which a wavelength multiplexer/demultiplexer 40 is used to link both the pump source 60 and a second interrogator unit 14" to the multimode waveguide of the first section of the sensor fiber, through the coupler.

Similar to the embodiments illustrated in FIGS. 1 and 3, multiple interrogator units may be coupled to one or both of the single mode and multi mode waveguides. As already discussed, interrogator units implementing a Raman scattering sensing operation may particularly benefit from being coupled to the multi mode waveguide.

The interrogator units, and also the pump source, may be considered as functional requirements which can be implemented using at least some shared components, such as a laser source, filters, circulators, gratings, spectometer and photodetector functions shared by one or more of the interrogator units and possibly also the pump source.

In arrangements similar to those illustrated in FIGS. 4 and 5 the second section of sensor fiber may be provided by a single mode fiber, coupled through the amplifier to the single mode waveguide of the first section of fiber. Use of a single mode fiber in the second section may provide better attenuation characteristics, resulting in better range and/or sensitivity for the sensing operations. This is a particularly applicable to an arrangement such as that of FIG. 4 in which the multimode waveguide of the first section is not used for sensing.

Figure 6:
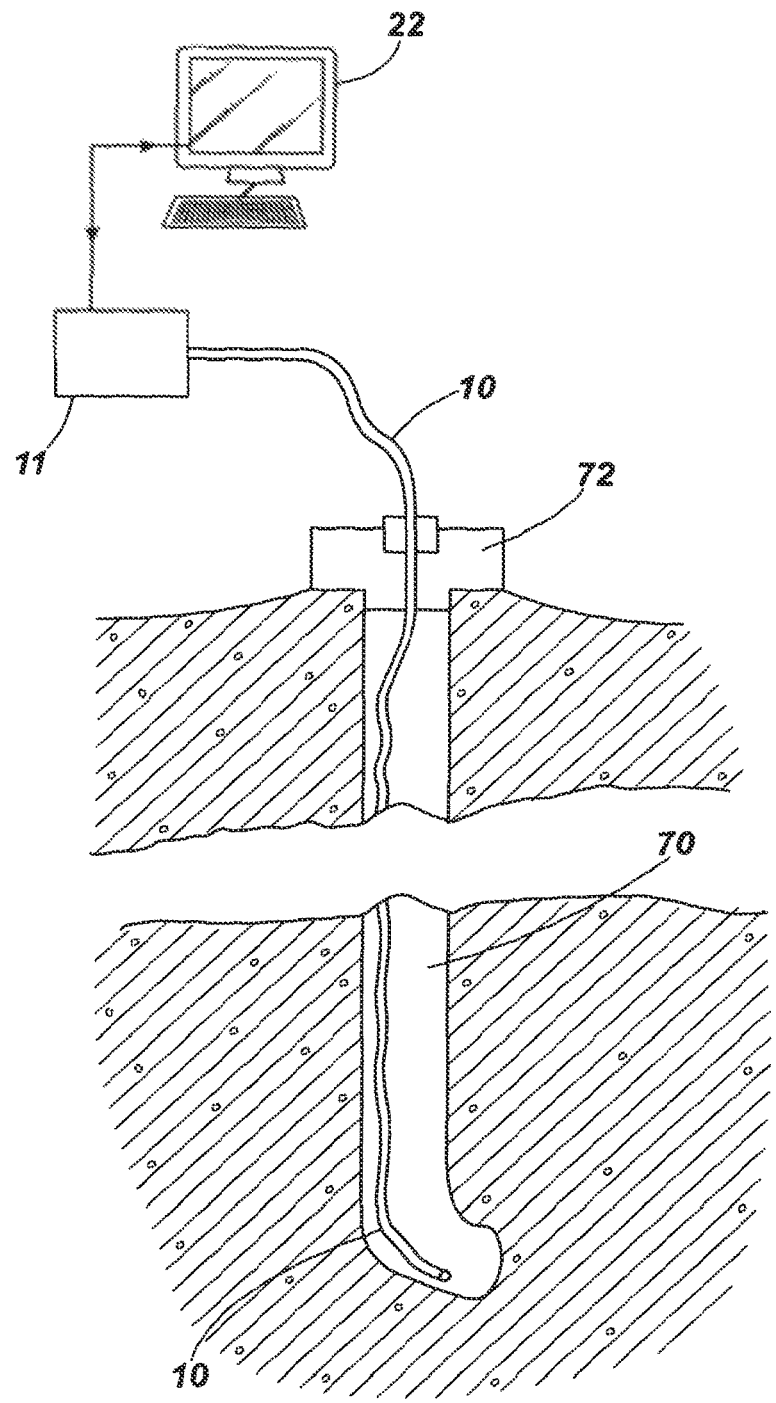
FIG. 6 shows an application of the invention in a well bore.

FIG. 6 illustrates use of the invention in a well bore 70. In this embodiment the double clad fiber 10 is coupled to interrogator 11 and extends through a well head 72 into the well bore 70. The double clad fiber and interrogator can then be used to detect one or more physical parameters within the well bore as a function of length along the double clad fiber 10, as already discussed above.

Figure 7:
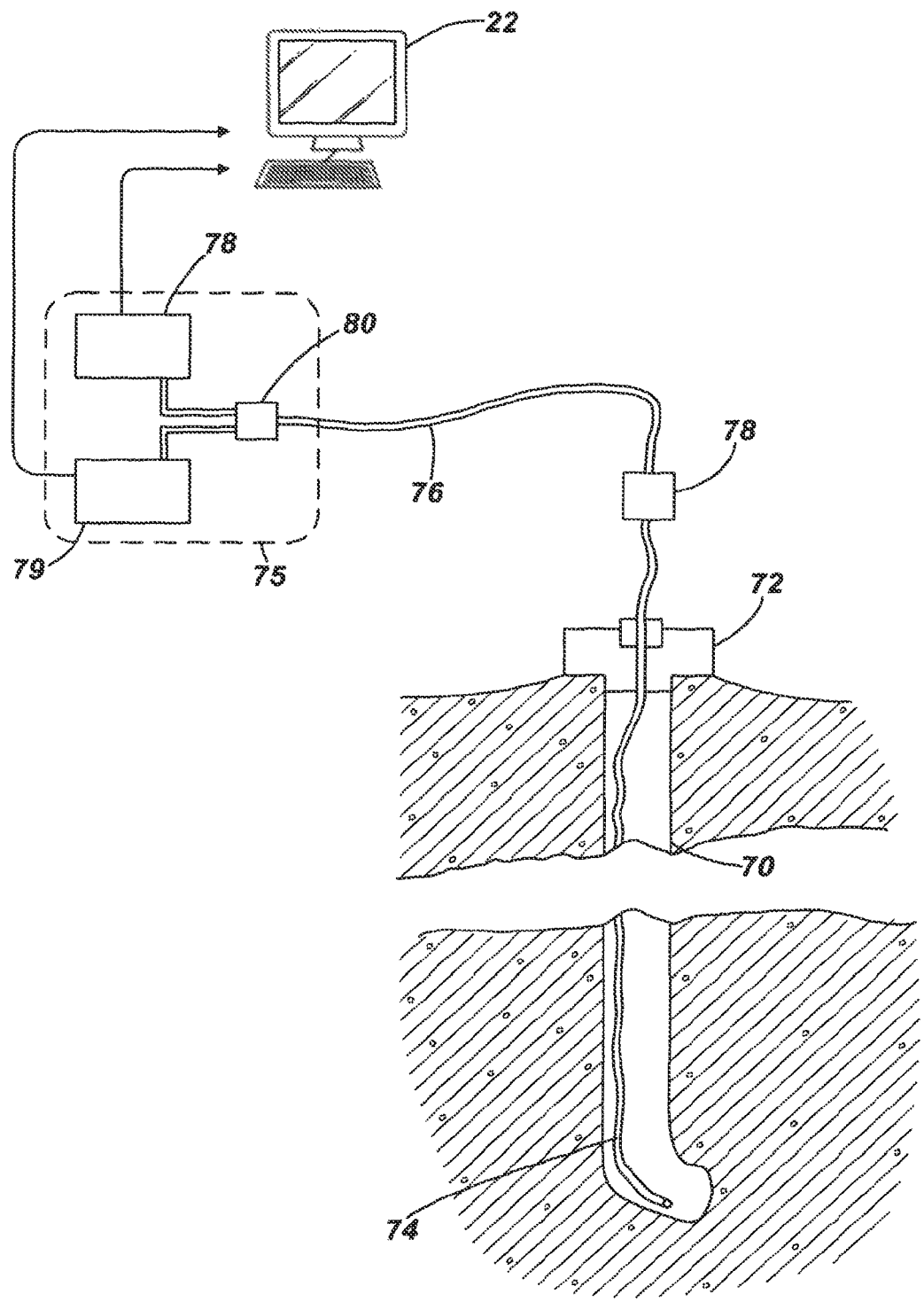
FIG. 7 shows an alternative use of double clad optical fiber to couple an interrogator to a multiple mode optical fiber already installed in a well bore or other environment.

FIG. 7 illustrates a further application of double clad fiber as discussed above in distributed fiber optic sensing, as a download fiber to couple an interrogator to an installed multimode sensing fiber. FIG. 7 again shows the well bore 70, such as an oil or gas well, capped by a well head 72. However, instead of a double clad fiber 10, a multimode optical fiber 74 is located within the well bore, and indeed may heave been installed there previously for a variety of purposes such as communication with down-hole tools and sensors, or distributed fiber optic sensing operations such as distributed temperature sensing using Raman backscattering within the fiber. Typically this multimode optical fiber 74 may be a standard, commercial multimode optical fiber. Regardless of the original intended purpose, the multimode optical fiber 74 may also be used for distributed vibration sensing using coherent or partially coherent Rayleigh backscatter, even though the quality of the vibration signal will be poorer than can be achieved using single mode fiber. Nevertheless, the multimode optical fiber 74 installed in the down-hole environment will typically be protected from conditions that might other wise prevent multimode fiber from being used for distributed vibration sensing at all. Unfortunately, once the multimode fiber 74 has emerged from the wellhead, it is often not sufficiently protected from such conditions, rendering the entire down-hole section of fiber much less suitable or unuseable for vibration sensing.

To enable the down-hole multimode fiber 74 to be used for vibration sensing, a length of double clad fiber 76 provides a link or coupling between the multimode fiber 74 and an interrogator 75, which may be similar or the same as interrogator 11 discussed above in connection with FIGS. 1 to 6. Typically, as shown in FIG. 7, the double clad fiber 76 may be coupled to the multimode fiber 74 by a well head coupling 78 shortly after the multimode fiber 74 has emerged form the well head, for example within about five meters of the well head.

The waveguides of the double clad fiber may be used for one or more of several functions, including delivering probe light and/or pump light to the multimode fiber. The interrogator 75, may be coupled to the (or a) single mode core of the double clad fiber, and the single mode core of the double clad fiber may then be coupled to the core of the multimode fiber for example through the well head coupling 78, and the interrogator 75 used to collect and analyses light backscattered within the multimode fiber 74 which has been transmitted on through the single mode core of the double clad fiber 76 to the interrogator. In particular, this backscattered light may be used for coherent or partially coherent Rayleigh backscatter detection of vibration as a function of position along the multimode fiber 74, or for other purposes. To this end, FIG. 7 shows a first component 78 of the interrogator 75 which is adapted to analyses backscattered light transmitted through the single mode core of the double clad fiber 76.

The interrogator 75 may also be coupled to the (or a) multimode waveguide of the double clad fiber 76, for example using a splitter/combiner 80 which is shown in FIG. 7 as part of the interrogator 75, so as to collect light backscattered within the multimode fiber 74 which has been transmitted on through the multimode core of the double clad fiber 76 to the interrogator. In particular, this backscattered light may be used for purposes such as distributed temperature sensing using Raman scattering, or for other purposes. To this end, FIG. 7 shows a second component 79 of the interrogator 75 which is adapted to analyses backscattered light transmitted through the multiple mode core of the double clad fiber 76. The splitter/combiner 80 may be a suitable mode and/or wavelength splitting and combining component, for example as described in connection with coupler 13 discussed above.

Using the described or similar arrangements the multimode fiber 74 may continue to be used for a previously intended purpose such as distributed temperature sensing through use of interrogator component 79, while extending use of the preinstalled fiber to distributed vibration sensing. This may extend the useful life of a pre-installed optical fiber and also avoid the expense of installing new, double clad fiber within the well bore 70, especially if the highest possible performance of distributed vibration sensing is not required. Alternatively, the arrangement may be used with a new installation of multimode fiber 74. The length of the double clad fiber 76 coupling the multimode fiber 74 to the interrogator 75 will typically be quite short (say, tens of meters) compared with the length of multimode fiber 74 within the well bore (typically more than a thousand meters), so that the attenuation and dispersion specifications of the double clad fiber can also be relaxed compared to the case where double clad fiber is also used in the well bore 74. This further reduces the cost of adding double clad fiber to the system.

The arrangements described in connection with FIG. 7 may be used in environments other than well bores, such as within or along buildings, bridges, pipelines and so forth.

Although specific embodiments of the invention have been described, it will be apparent that a variety of modifications may be made without departing from the scope of the invention. For example, the sensor fiber may be made up of a number of sections of similar or dissimilar fiber types, with connectors, intermediate sections of other fiber types and so forth, with at least one section having the two or more co-extending waveguides of the invention. The probe light injected into each waveguide could be identical or different, from the same or different sources, as required or suitable for the chosen sensing operations. The two or more sensing operations may be carried out simultaneously, or over separate of partially overlapping timeframes or duty cycles.

The invention claimed is:

1. A distributed optical fiber sensing system comprising:
    a sensor optical fiber comprising first and second waveguides extending together along the fiber, the first waveguide being a single mode waveguide and the second waveguide being a multi mode waveguide; and
    an interrogation system coupled to the sensor optical fiber and arranged to measure one or more physical parameters as a function of position along the sensor optical fiber by carrying out at least first and second sensing operations to detect properties of probe light backscattered within the first and second waveguides respectively.

2. The system of claim 1 wherein the first and second adjacent waveguides are waveguides of a double clad optical fiber in which the single mode waveguide is a single mode core of the double clad fiber.

3. The system of claim 1 wherein the first sensing operation utilizes Brillouin backscatter or Rayleigh scattering within the first, single mode waveguide to detect properties of probe light backscattered within the first waveguide.

4. The system of claim 3 wherein the first sensing operation utilizes coherent Rayleigh backscatter within the first, single mode waveguide.

5. The system of claim 4 wherein the interrogation system measures vibration using the first sensing operation.

6. The system of claim 1 wherein the second sensing operation utilizes Raman scattering within the second, multimode waveguide to detect properties of probe light backscattered within the second waveguide.

7. The system of claim 1 in which the interrogation system is arranged to carry out the sensing operations each using at least one of Rayleigh scattering, optical time domain reflectometry, coherent or partially coherent optical time domain reflectometry, spontaneous or stimulated Brillouin scattering, and spontaneous or stimulated Raman scattering, to measure said one or more physical parameters as a function of position along the sensor optical fiber.

8. The system of claim 1 arranged to derive at least one said physical parameter by combining properties of backscattered probe light detected by two or more of the sensing operations.

9. The system of claim 1 wherein the interrogation system is arranged to carry out the first and second sensing operations utilizing light of different wavelengths to thereby avoid interference between the first and second sensing operations arising from leakage between the first and second waveguides.

10. The system of claim 1 wherein the interrogation system is arranged to carry out multiple sensing operations using one of said first and second waveguides, said multiple sensing operations utilizing probe light of different wavelength for each said sensing operation.

11. The system of claim 1 further comprising a pump light source coupled to the second waveguide, and wherein the sensor optical fiber includes a section remote from the interrogation system configured as an optical amplifier such that probe light in the first waveguide is amplified by the optical amplifier.

12. The system of claim 1 further comprising a pump-signal combiner arranged to optically couple the interrogation system to the first and second waveguides.

13. The system of claim 12 wherein a double-clad fiber section of the sensor optical fiber is terminated at the pump-signal combiner, and the pump-signal combiner couples the first and second waveguides of the double clad fiber separately to at least first and second interrogation components of the interrogation system.

14. The system of claim 13 wherein said first interrogation unit is coupled by the pump-signal combiner to the first, single mode waveguide of the double clad fiber and is adapted to determine Rayleigh and/or Brillouin backscatter properties of the sensor optical fiber, and the second interrogation unit is coupled by the pump-signal combiner to the second, multi mode waveguide of the double clad fiber and is adapted to determine Raman backscatter properties of the sensor optical fiber.

15. A method of monitoring an extended environment, comprising:
    positioning a sensor optical fiber through the environment, the sensor optical fiber having first and second co-extending waveguides, the first waveguide being a single mode waveguide of the sensor optical fiber, the second waveguide being a multimode waveguide of the sensor optical fiber;
    performing separate first and second sensing operations using the first and second waveguides respectively to determine information on the backscattering of probe light within the sensor optical fiber, as a function of position along the sensor optical fiber; and
    determining parameters relating to said extended environment as a function of position along said sensor optical fiber from said determined information.

16. The method of claim 15 further comprising combining backscattering information from said first waveguide with backscattering information from said second waveguide in said step of determining parameters.

17. The method of claim 15 wherein said sensor optical fiber comprises double clad fiber providing said first and second co-extending waveguides.

18. The method of claim 17 wherein the single mode waveguide is a single mode core of the double clad fiber.

19. The method of claim 15 wherein the first sensing operation utilizes Brillouin backscatter or Rayleigh scattering within the first, single mode waveguide to detect properties of probe light backscattered within the first waveguide.

20. The method of claim 19 wherein the first sensing operation utilizes coherent Rayleigh backscatter within the first, single mode waveguide.

21. The method of claim 20 wherein the interrogation system measures vibration using the first sensing operation.

22. The method of claim 15 wherein the second sensing operation utilizes Raman scattering within the second, multimode waveguide to detect properties of probe light backscattered within the second waveguide.

23. The method of claim 15 in which the interrogation system is arranged to carry out the sensing operations each using at least one of Rayleigh scattering, optical time domain reflectometry, coherent or partially coherent optical time domain reflectometry, spontaneous or stimulated Brillouin scattering, and spontaneous or stimulated Raman scattering, to measure said one or more physical parameters as a function of position along the sensor optical fiber.

24. The method of claim 15 wherein the interrogation system is arranged to carry out the first and second sensing operations utilizing light of different wavelengths to thereby avoid interference between the first and second sensing operations arising from leakage between the first and second waveguides.

25. The method of claim 15 wherein the interrogation system is arranged to carry out multiple sensing operations using one of said first and second waveguides, said multiple sensing operations utilizing probe light of different wavelength for each said sensing operation.

* * * * *